United States Patent

[11] 3,611,838

| [72] | Inventor | Robert C. Utter<br>Indianapolis, Ind. |
|---|---|---|
| [21] | Appl. No. | 13,319 |
| [22] | Filed | Feb. 24, 1970 |
| [45] | Patented | Oct. 12, 1971 |
| [73] | Assignee | General Motors Corporation<br>Detroit, Mich. |

[54] HYDRAULIC CONTROL FOR NONSYNCHRONOUS SHIFTING HYDROMECHANICAL TRANSMISSION
8 Claims, 6 Drawing Figs.

[52] U.S. Cl. .................................................. 74/868,
74/687, 74/720.5
[51] Int. Cl. ..................................................... B60k 21/00,
F16h 47/04, F16h 37/06
[50] Field of Search .......................................... 74/867,
868, 687

[56] References Cited
UNITED STATES PATENTS
3,324,739  6/1967  Brueder ....................... 74/867
3,455,184  7/1969  Frandsen et al. .............. 74/867 X
3,465,616  9/1969  Schou ........................... 74/687 X
3,496,803  2/1970  Whelahan ..................... 74/687 X Primary Examiner—Arthur T. McKeon
Attorneys—W. E. Finken, A. M. Heiter and D. F. Scherer ABSTRACT: A transmission control for use with a hydraulic transmission for controlling pump displacement and mechanical gear ratio change in the transmission. The control has a ratio governor which directs displacement change signals to the hydrostatic pump and supplies a signal to a ratio shift signal valve which provides hysteresis. A shift signal valve, operatively connected with the pump, directs shift signals from the main pressure system to the ratio shift signal valve at predetermined pump displacements. The ratio shift signal valve directs the shift signals to shift valves to effect an up or downshift in the mechanical gear ratios. The control system also has a pressure regulator disposed between the main pressure supply and the ratio governor to control the stability of the pump control during operation of the transmission in the low drive range which regulator is effectively removed from the control system during operation in drive ranges other than low.

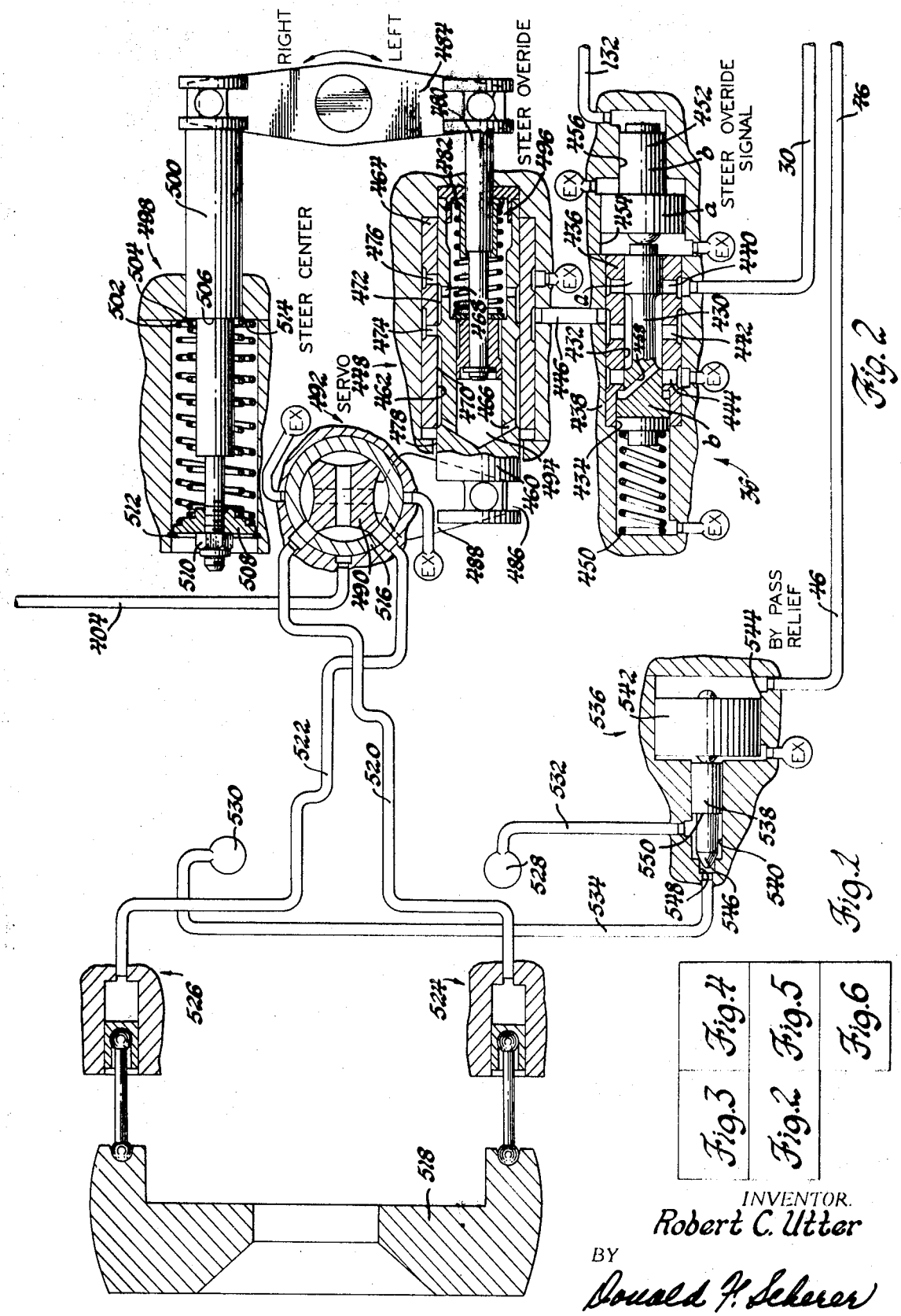

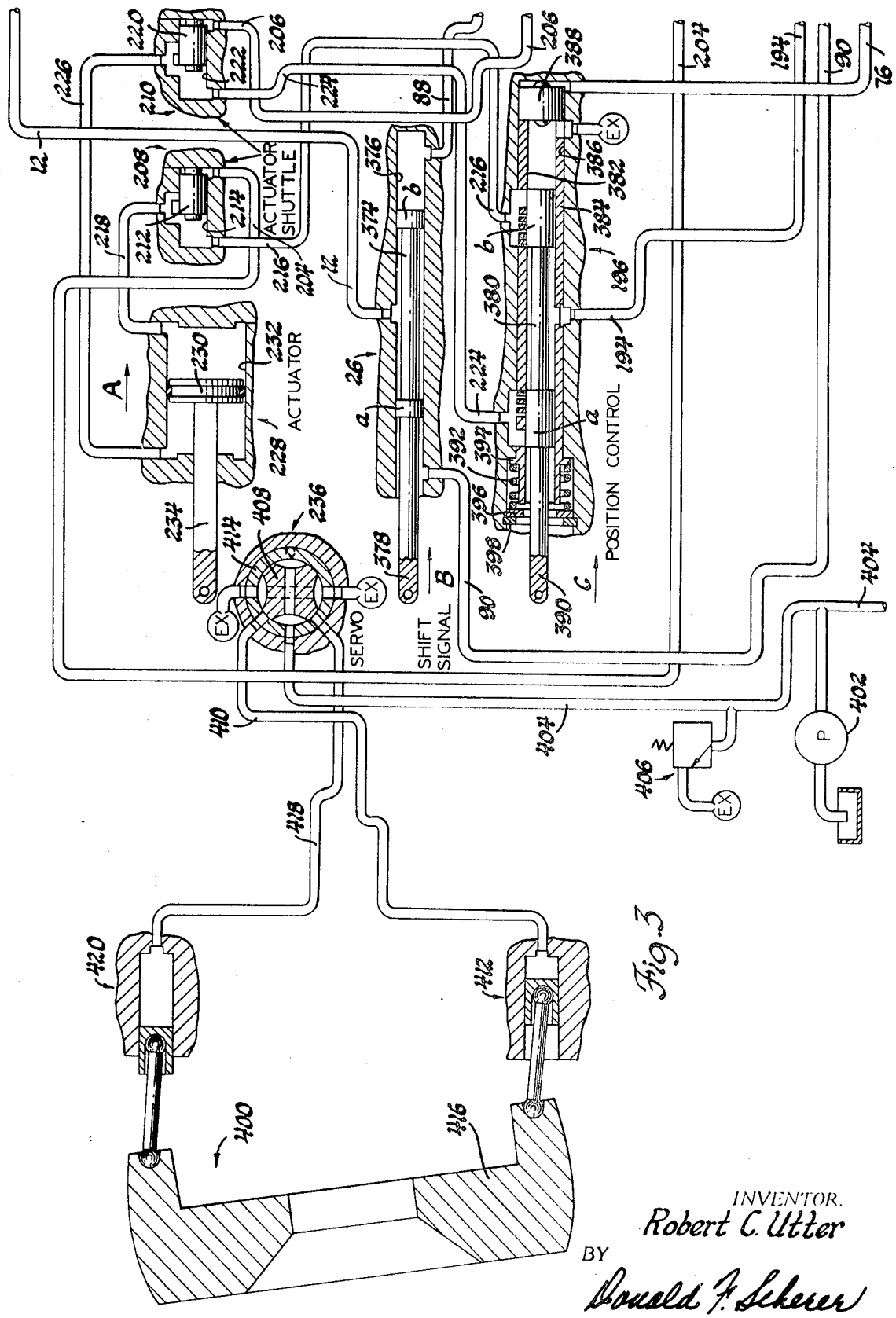

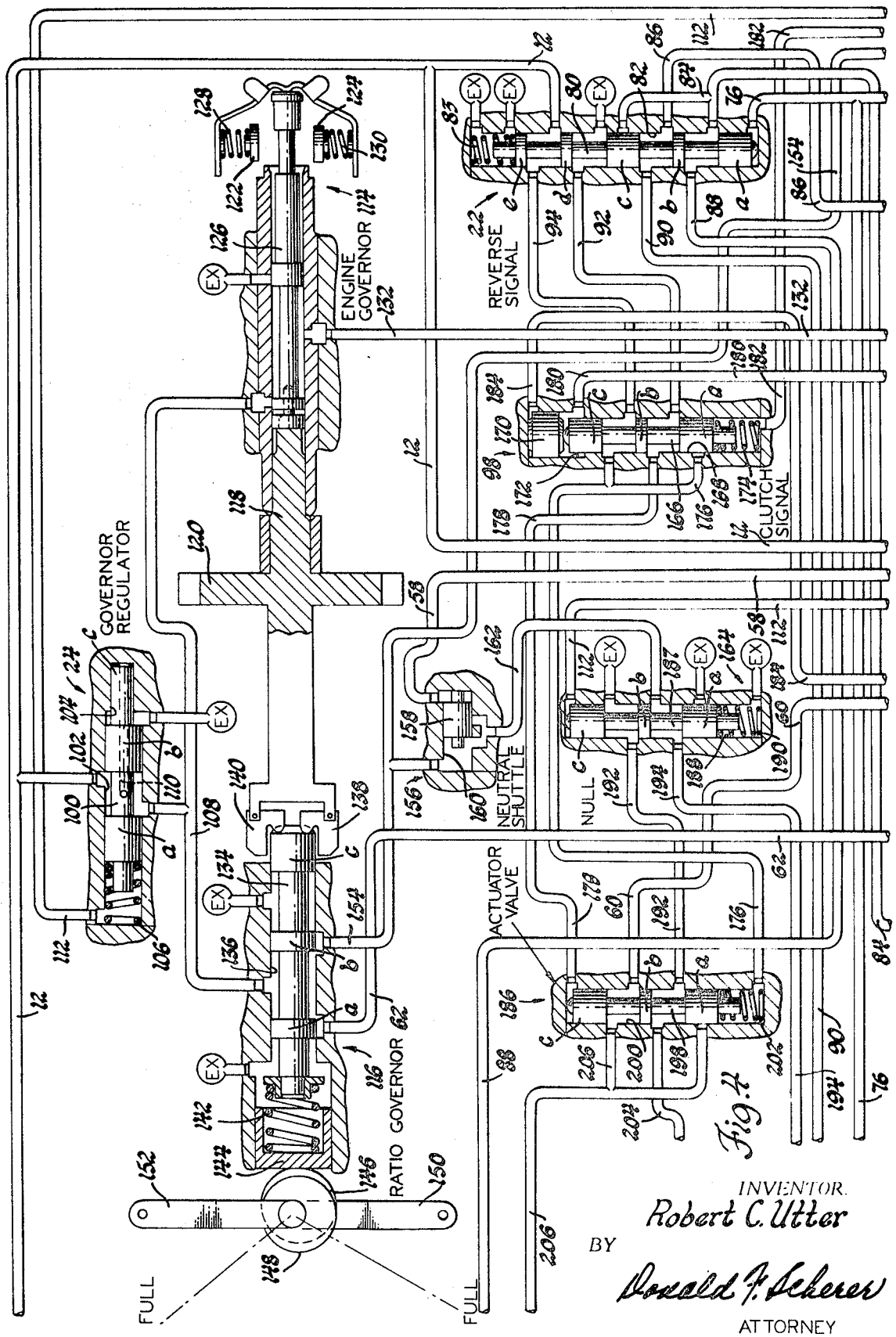

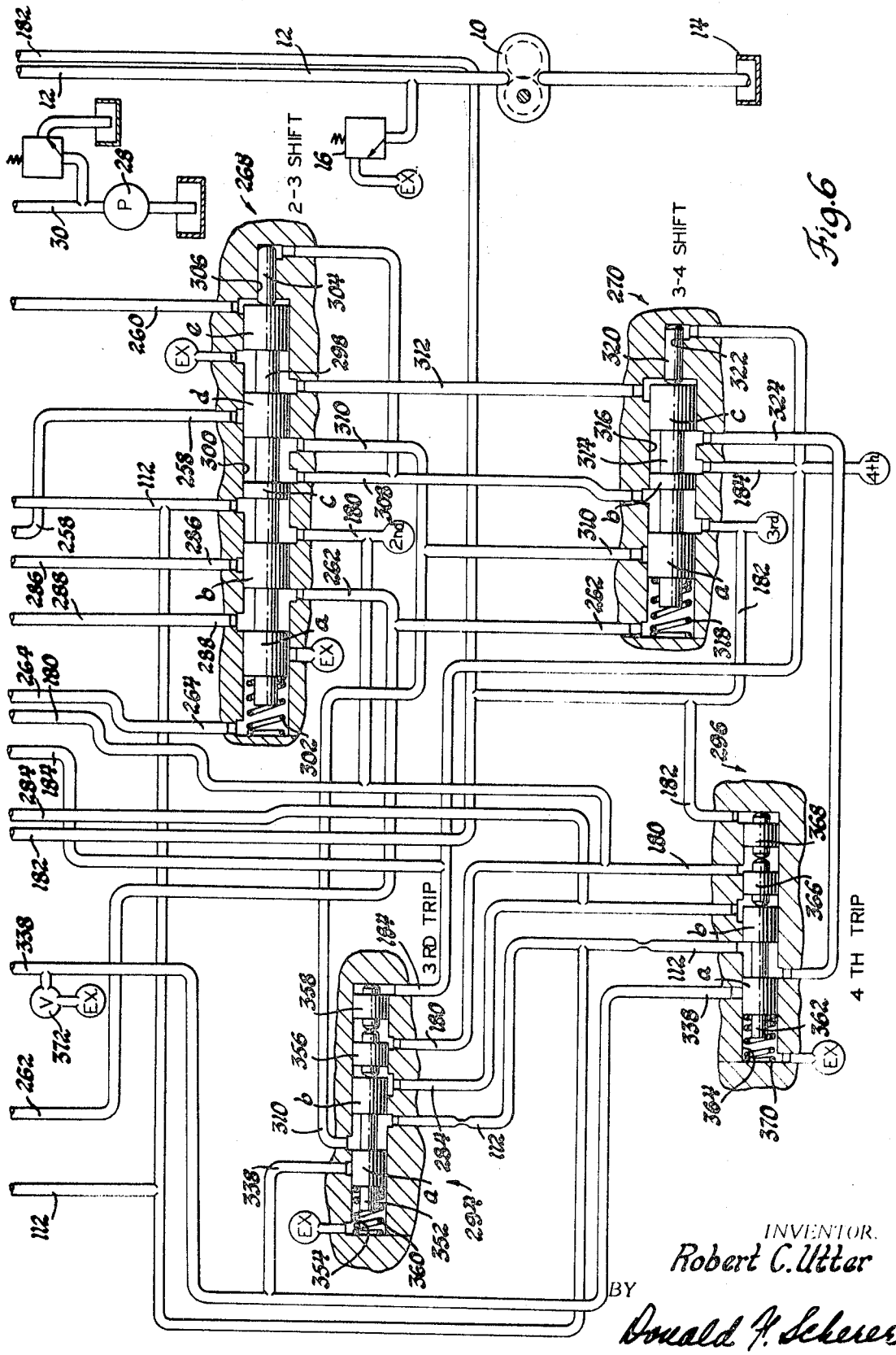

HYDRAULIC CONTROL FOR NONSYNCHRONOUS SHIFTING HYDROMECHANICAL TRANSMISSION

The invention herein described was made in the course of work under a contract or subcontract thereunder with the department of the Army.

This invention relates to hydraulic transmission controls and more particularly to controls for establishing mechanical ratio change at a predetermined pump displacement.

This control system, including the present invention, is designed for use with a hydromechanical transmission in which the motor of the hydrostatic portion of the drive provides driving torque during one drive ratio and reaction torque during another drive ratio and wherein its shifts from one ratio to another are designed to be synchronized. The hydraulic ratio of the transmission is controlled by the displacement of a variable displacement pump. In synchronized shifting hydromechanical transmissions, such as that shown in U.S. Pat. No. 3,426,621 issued Feb. 11, 1969 to Mooney, Jr. et al., the gearing is designed such that the oncoming friction member has the same rotational speed before and after the shift so that there is no slippage between the adjacent members of the friction device during shifting. However, due to the exchange of efficiencies in the hydrostatic portion of the transmission, full synchronization is difficult to achieve. The present control system is designed to provide ratio change at hydraulic motor speeds other than the synchronous speed. The system is, however, designed such that the hydraulic pump displacement is constant during the shift and the change of motor speed affected by the shift accommodates the efficiency change. To accomplish this shift requirement, a shift signal valve is operatively connected with the displacement member of the hydrostatic pump such that the spool of the shift signal valve will be moved with the displacement member of the pump. As the valve spool reaches a predetermined location in a valve bore indicating the desired pump displacement for shifting has been achieved, a shift signal passes through the shift signal valve and is directed to a ratio shift signal valve to affect a 1-2, 2-3, or 3-4 upshift or downshift. The shift signal after passing through the ratio shift signal valve is directed to the 1-2, 2-3 or 3-4 shift valves which are then upshifted or downshifted to direct fluid pressure to the friction engaging devices which determine the mechanical ratio in the transmission. To insure the oncoming friction device is engaged before the offgoing friction device is disengaged, a plurality of trip valves are associated with the shift valves to maintain the offgoing friction device pressurized until the oncoming friction device has sufficient engagement pressure to carry the torque.

A ratio governor which emits an advance or overspeed signal and a return or underspeed signal is used to control the pump displacement. These signals are distributed by the control system to an actuator which controls the movement of a hydraulic servo which, in turn, controls the displacement member of the hydraulic pump. The ratio governor signals also go to the ratio shift signal valve such that the ratio shift signal valve is positioned in an upshift or downshift position depending upon the signal emitted by the ratio governor. This provides a small amount of hysteresis at the shift points. A governor regulator valve is also associated with the ratio governor to control the inlet pressure to the ratio governor during operation of the transmission in the low drive range. In the low drive range, the inlet pressure is reduced below mainline pressure to improve stability and is increased to main pressure in the other drive ranges to improve response of the hydrostatic drive system. When the mechanical gear ratio has been upshifted from low range to second range, a pressure signal is directed to the governor regulator to cause the inlet pressure to increase from the low pressure to mainline pressure.

It is therefor an object of this invention to provide an improved hydraulic control system for a hydromechanical transmission, a shift signal valve associated with the hydrostatic unit to provide shift signals at a predetermined displacement of the hydrostatic unit.

It is another object of this invention to provide in an improved hydraulic control system for use with a hydromechanical transmission, a shift signal valve operatively connected with the hydrostatic pump to direct shift signals at a predetermined pump displacement to a ratio shift signal valve for providing shift signals to a plurality of shift valves.

Still another object of this invention is to provide in an improved hydraulic control system for use with a hydromechanical transmission, a ratio governor for determining the displacement of the hydrostatic pump and for determining an upshift or downshift position of a ratio shift signal valve which receives shift signals from a shift signal valve operatively connected with the hydrostatic pump.

It is another object of this invention to provide in an improved hydraulic control for use with a hydromechanical transmission a regulator valve upstream of a ratio governor to provide a reduced inlet pressure to the ratio governor during low speed operation of the transmission to thereby provide improved stability of the transmission.

Other objects and advantages of this invention will be more apparent to those skilled in the art from the following description and drawing in which:

FIG. 1 is a block diagram showing the relative positions of FIGS. 2–6;

FIG. 2 is a diagrammatic view of the steer portion of a hydromechanical transmission;

FIG. 3 is a diagrammatic view of a part of the propulsion unit and part of the control system;

FIG. 4 is a diagrammatic view of a portion of the control system;

FIG. 6 is a diagrammatic view of a portion of the control system.

Figure 5:
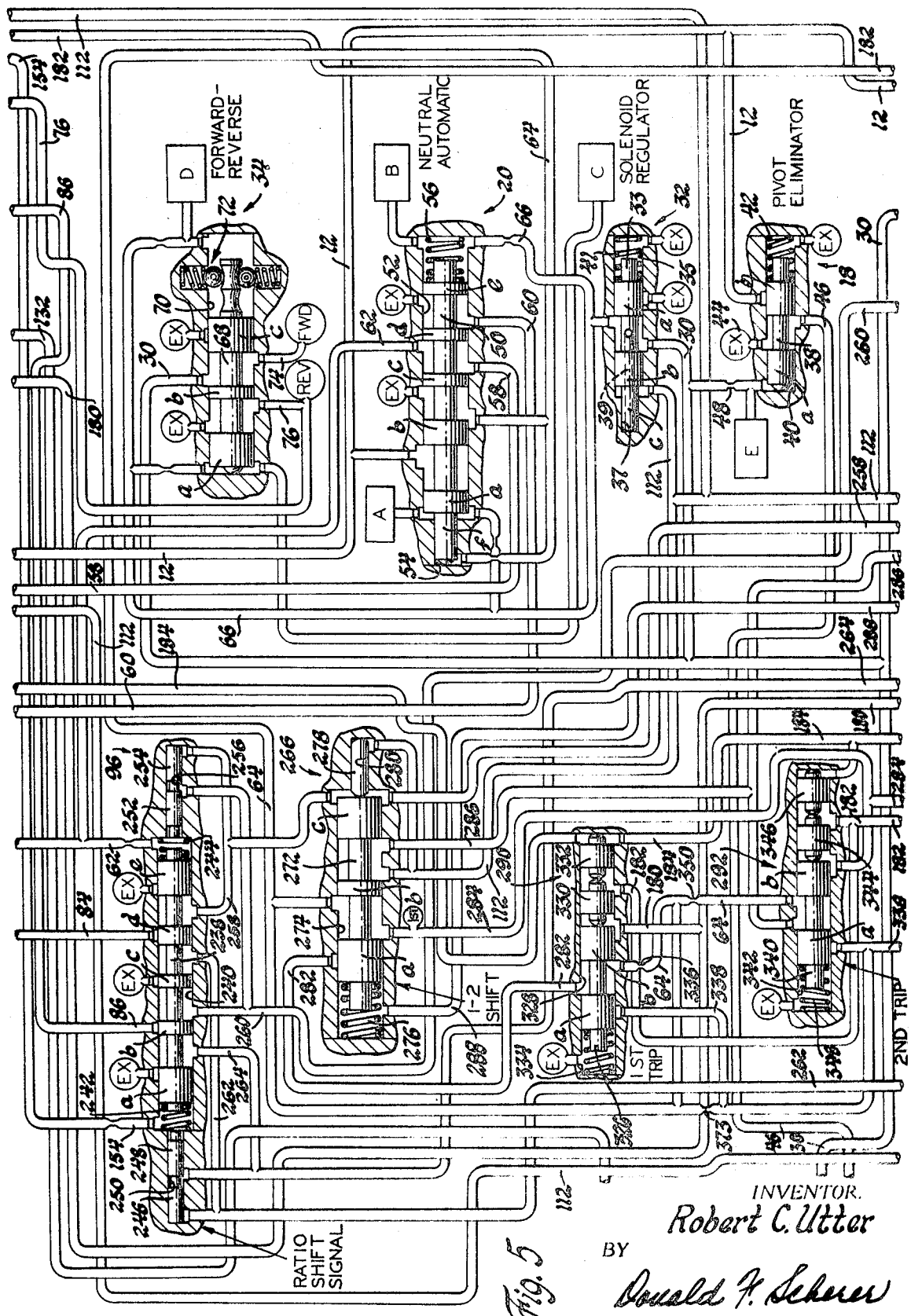
FIG. 5 is a diagrammatic view of a portion of the control system.

Referring to the drawings in which like characters represent like or corresponding parts, there is shown a main pump 10 supplying fluid through a main passage 12 from a reservoir 14 to the control system.

The fluid pressure in the main passage 12 is established by a conventional pressure regulator valve 16. The main passage 12 distributes main pressure fluid through a pivot eliminate valve 18, a neutral automatic valve 20, a reverse signal valve 22, a governor regulator valve 24, and a shift signal valve 26. A charge pump 28 supplies pressure through a charge passage 30 to the pivot eliminate valve 18, a solenoid regulator valve 32, a forward reverse valve 34 and a steer override valve 36.

The pivot eliminate valve 18 includes a valve spool 38 having spaced equal diameter lands $a$ and $b$ slidably disposed in a valve bore 40, and a compression spring 42 urging the valve spool 38 to one end of the valve bore 40. The valve bore 40 is connected to the mainline 12, the charge passage 30, an exhaust passage 44 and a bypass and relief passage 46. The charge passage 30 has a restriction 48 downstream of which is disposed a solenoid valve E The solenoid valve E, when not energized, permits fluid pressure to build up at the end of valve bore 40 adjacent land $a$ to cause the valve spool 38 to shift to the right against the springs 42 thereby providing fluid communication between main passage 12 and the bypass and relief signal passage 46.

The neutral automatic valve 20 has a valve spool 50 having five equal diameter lands $a$, $b$, $c$, $d$ and $e$ slidably disposed in a valve bore 52 and a reduced diameter land $f$ slidably disposed in a valve bore 54, a compression spring 56 urges the valve spool 50 to the left so that land $f$ abuts the one end of valve bore 54. The bore area adjacent land $a$ is connected to the solenoid A and the area of the bore 52 adjacent the right end of land $e$ is connected to a solenoid valve B. The valve bore 52 is connected to the main passage 12, a neutral advance passage 58, an automatic advance passage 60, an advance passage 63, a range clutch apply passage 64 and a solenoid feed passage 66. The valve bore 54 is also connected to the range clutch apply passage 64. When the solenoid A is energized in neutral, the area adjacent land $a$ will be exhausted and the neutral automatic valve 20 will remain in the position shown. When the solenoid B is energized for automatic drive, the area adjacent land *e* will be exhausted thereby permitting pressure build up on land *a* to cause the valve spool 50 to shift against the spring 56 to connect the advance passage 62 to the auto advance passage 60 while connecting the neutral advance passage 58 to exhaust. Also, when the valve spool 50 is shifted to the automatic position, the main passage 12 will be connected to the range clutch apply passage 64 so that this passage is pressurized and the end of valve land *f* will be pressurized to assist in holding the valve spool 50 to the right.

The solenoid regulator valve 32 has a valve spool 33 having two equal diameter spaced lands *a* and *b* and a smaller diameter land *c*. The valve land *a* and *b* are slidably disposed in a valve bore 35 and the smaller land *c* is slidably disposed in a valve bore 37. A passage 39 communicates the area between lands *a* and *b* with the end of valve land *c* such that when fluid pressure in charge passage 30 enters the valve between land *a* and *b*, it is distributed to the end of valve land *c* to cause the valve spool 33 to move to the right against a spring 41 until the exhaust passage is opened by valve land *a*. The pressure thus regulated by the valve 32 is distributed to the solenoid feed passage 66. The 2–4 range clutch apply passage 112 connected to the differential area between lands *b* and *c* such that when the second through fourth ratio is engaged, the valve spool 33 will be moved to the right against the spring to connect the solenoid feed passage 66 to exhaust and eliminate pressure in the solenoid feed system.

The forward-reverse valve 34 has a valve spool 68 having three equal diameter spaced lands *a*, *b* and *c* slidably disposed in a valve bore 70. The valve spool 68 is positioned in the valve bore 70 by a detent mechanism 72. The valve bore 70 is connected to the charge passage 30, a forward clutch passage 74, a reverse clutch passage 76, and to the solenoid feed passage 66. The solenoid feed passage 66 has two solenoid valves c and D associated therewith. When the solenoid C is energized, the left end of the valve spool 68 will be exhausted to permit the valve to move to the left due to the pressure on the right end of the valve and the valve will be in the forward drive position as shown connecting the charge passage 30 to the forward clutch passage 74 to apply the forward clutch. When the solenoid D is energized, the right end of the valve spool 68 will be exhausted thereby permitting the valve 68 to move to the right to connect the forward clutch passage 74 to exhaust and the reverse clutch passage 76 to the charge passage 30 thereby applying the reverse clutch.

The reverse signal valve 22 has a valve spool 80 having equal diameter spaced lands *a*, *b*, *c*, *d* and *e* slidably disposed in a valve bore 82 and urged to one end thereof by a compression spring 83. The valve bore 82 is connected with the main pressure passage 12, the reverse signal passage 76, a 1–2–1, 3–4–3 signal passage 84, a 2–3–2 signal passage 86, a plus signal passage 88, a minus signal passage 90, a reverse signal passage 92 and a forward signal passage 94. In the position shown, the spring set position, the main passage 12 is connected to the forward signal passage 84, the reverse signal passage 92 connected to exhaust, the 2–3–2 passage 86 is connected to the minus signal passage 90, and valve plus signal passage 88 is spaced to the 1–2–1 passage 84. When the reverse clutch is engaged, the passage 76 will be pressurized thereby pressurizing the end of land *a* causing the valve spool 80 to move against the spring 83 thereby connecting the main passage 12 to reverse signal passage 92 and the forward signal passage 94 to exhaust, also when the valve spool 80 is shifted, the minus signal passage 90 will be connected to the 1–2–1 passage 84 and the plus signal passage 88 will be connected to the 2–3–2 passage 86. The 1–2–1 passage 84 and the 2–3–2 passage 86 are both connected to a ratio shift signal valve 96. The forward signal passage 94 and the reverse signal passage 92 are connected to a clutch signal valve 98 and the plus and minus signal passages 88 and 90 are connected to the shift signal valve 26.

The governor regulator valve 24 has a valve spool 100 having two equal diameter lands *a* and *b* slidably disposed in a valve bore 102 and a reduced diameter land *c* slidably disposed in a valve bore 104. A compression spring 106 urges the valve spool 100 to the right thereby permitting fluid pressure in main passage 12 to enter between valve lands *a* and *b* to communicate with a governor feed passage 108. The valve spool 100 has a central passage 110 which connects the area between lands *a* and *b* with the bore 104 to permit fluid pressure to develop in bore 104 adjacent the end of valve land *c* thereby moving the valve spool 100 to the left against the springs 106 to disconnect main pressure passage 12 from governor feed passage 108 at a predetermined pressure. The left end of valve bore 102 is connected with a 2–4 range clutch apply passage 112 such that when that passage is pressurized, the valve spool will remain in the position shown thereby directing main pressure in passage 12 to the governor feed passage 108. Thus in the low drive range, the pressure in governor feed passage 108 will be reduced below main line pressure while in the other drive ratios, the pressure in governor feed passage 108 will be equal to main line pressure. The governor feed passage 108 is connected to an engine governor 114 and a ratio governor 116.

The engine governor 114 is a conventional flyball governor which has an input shaft 118 driven by a gear 120 which is adapted to be driven by the engine. As the engine speed increases, a pair of weights 122, 124 deflect outwardly to impose a load on a valve spool 126 through springs 128 and 130. As the engine speed increases, and the force on the valve spool 126 increases, thereby increasing the output pressure of the governor 114 proportional to engine speed, which output pressure is communicated to an engine governor passage 132. The engine governor passage 132 is connected to the steer override signal valve 36.

The ratio governor 116 includes a valve spool 134 having three equal diameter spaced lands *a*, *b* and *c* slidably disposed in a valve bore 136. The right end of the valve spool 134 is acted upon by a pair of flyweights 138 and 140, which are rotated by the shaft 118 through the gear 120 so that an outward force proportional to engine speed is imposed thereon. A spring 142 is compressed between the other end of the valve spool 134 and a spring seat 144 which abuts either cam 146 or 148. The cams 146 and 148 are operated by levers 150 and 152 respectively. The cam 150 is operated directly by the operator through the throttle linkage not shown and the cam 152 is operated upon by compressor discharge pressure of a gas turbine engine which is adapted to drive the transmission.

A complete description of the operation of a ratio governor such as 116 can be found in U.S. Ser. No. 863,631. It will be sufficient here to understand that the governor feed passage 108 will be connected between lands *a* and *b* to either the advance passage 62 or a return passage 154 depending upon whether the engine speed is above or below a predetermined value as compared to throttle setting. If the engine overspeeds when compared to a throttle setting as determined by the controlling cam 148 or 146, the advance passage 62 will be pressurized. If the engine speed is under a predetermined value when compared with the throttle setting as determined by the controlling cam 148 or 146, a return signal will be present in passage 154. The advance passage 62 is connected to the ratio shift signal valve 96 and the neutral automatic valve 20. The return passage 154 is connected to a neutral shuttle valve 156 and to the ratio shift signal valve 96. The neutral shuttle valve 156 consists of a valve plug 158 slidably disposed in a valve bore 160 which is in communication with the return passage 154, the neutral advance passage 58 and another return passage 162. If pressure is present in the return passage 156, the valve 158 will move to the right as shown, providing communication between passages 156 and 162. If fluid pressure is present in the neutral advance passage 58 such as in the neutral condition, the plug valve 158 will move to the left providing fluid communication between passage 58 and 162. The passage 162 is connected to a null valve 164.

The clutch signal valve 98 includes a valve spool 166 having three equal diameter lands a, b, and c slidably disposed in a valve bore 168, a plug valve 170 slidably disposed in a valve bore 172, adjacent land c and a compression spring 174 compressed between one end of bore 168 and the valve land a to urge the valve spool 166 and a plug valve 170 to the position shown. The valve bore 168 is connected to the forward signal passage 94, the reverse signal passage 92, a 1-3 signal passage 176, a 2-4 signal passage 178, a second ratio engage passage 180, a third ratio engage passage 182, a fourth ratio engage passage 184. In the position shown, which is the first and third drive range position, the forward signal passage 94 is connected with the 1-3 signal passage 176 and the reverse signal passage 92 is connected with the 2-4 signal passage 178. If the second or fourth gear ratio is engaged, the passage 180 or 184 will be pressurized thereby causing the valve spool 166 or the plug valve 170 and valve spool 166 to move downward against the spring 174 thereby connecting the passage 94 to the passage 178 and the passage 92 to the passage 176. The 1-3 passage 176 and the 2-4 passage 178 are connected with opposite ends of an actuator valve 186.

The null valve 164 includes a valve spool 187 having equal diameter spaced lands a, b and c slidably disposed in a valve bore 188 and a compression spring 190 between one end of bore 188 and the valve land a. The valve bore 188 is connected to the return passage 162, the 2-4 range clutch apply passage 112, a 2-4 return passage 192 and a neutral low return passage 194. In the position shown, which is the neutral and low position, the return passage 162 is connected to the neutral low return passage 194. When any of the friction engaging devices from the second through the fourth gear ratio are engaged, the passage 112 is pressurized which will cause the valve spool 187 to move downward against the spring 190 thereby connecting a neutral low return passage 194 to exhaust while connecting the return passage 162 to the 2-4 return passage 192. The neutral low return passage 194 is connected to a position or creep control valve 196. The 2-4 return passage 192 is connected to the actuator valve 186.

The actuator valve 186 has a valve spool 198 having equal diameter spaced lands a, b and c slidably disposed in a valve bore 200 and a compression spring 202 compressed between the valve land a and one end of bore 200. The valve bore 200 is connected to the passages 176 and 178 at opposite ends thereof, to the automatic advance passage 60 and the 2-4 return passage 192. The bore 200 is also connected to a 2,4 advance passage 204 and a 1,3 advance passage 206. In the position shown, which is the first and third drive range position, the automatic advance passage 60 is connected to the 1,3 advance passage 206 and the 2-4 return passage 192 is connected to the 2,4 advance passage 204. When the 2,4 signal passage 178 is pressurized, a valve spool 198 will move downward against the spring 202 to connect the automatic advance passage 60 to the 2,4 advance passage 204 and the 2-4 return passage 192 to the 1,3 advance passage 206. The 2,4 advance passage 204 is connected to an actuator shuttle valve 208. The 1,3 advance passage 206 is connected to an actuator shuttle valve 210. The actuator shuttle valve 208 includes a plug valve 212 slidably disposed in a bore 214 which is connected to a low forward return passage 216 and an actuator passage 218. The actuator shuttle valve 210 has a plug valve 220 slidably disposed in a bore 222 which is connected to a low reverse return passage 224 and an actuator passage 226. The actuator passages 226 and 218 are connected to an actuator 228 which is comprised of an actuator piston 230 slidably disposed in a bore 232. The piston 230 has a piston rod 234 operatively connected with a hydraulic servo 236 by a linkage, not shown. The actuator passages 318 and 226 are connected to the bore 232 in such a manner that when passage 218 is pressurized, the piston 230 and rod 234 will move to the left and when passage 226 is pressurized, the piston 230 and rod 234 will move to the right.

The ratio shift signal valve 96 includes a valve spool 238 having equal diameter spaced lands a, b, c, d and e slidably disposed in a valve bore 240. A pair of springs 242 and 244 centering the valve spool 238 in the bore 240, a pair of plug valves 246, 248 slidably disposed in a valve bore 250 and a pair of plug valves 252 and 254 slidably disposed in a valve bore 256. The chamber containing spring 242 is connected to the return passage 154 and the chamber containing spring 244 is connected to the advance passage 62 such that when a return signal is present, the valve spool 238 will be shifted to the right against spring 244, allowing a downshift signal from the valve. When an advance signal is present, the valve spool 238 will be shifted to the left against spring 242 allowing an upshift signal from the valve. Hysteresis is obtained by requiring an engine overspeed (advance) signal to upshift and an engine underspeed (return) signal to downshift. The valve bore 240 is connected with the 1-2-1, 3-4-3 passage 84, the 2-3-2 passage 86, a 1-2, 3-4 signal passage 258, a 2-3 signal passage 260, a 4-3, 2-1 signal passage 262 and a 3-2 passage 264. The 1-2, 3-4 signal passage 258 is also connected to the bore 256 adjacent one end of plug valve 254, the 2-3 signal passage 260 is connected to the bore 256 between the plug valves 252 and 254, the 3-2 signal passage 264 is connected to the valve bore 250 between the plug valve 246 and 248 and the 4-3, 2-1 signal passage 262 is connected to the bore 250 adjacent the end of plug valve 246. The 1-2, 3-4 signal passage 258 is also connected to a 1-2 shift valve 266 and a 2-3 shift valve 268. The 2-3 signal passage 260 is connected with the 2-3 shift valve 268 as is the 3-2 signal passage 264. The 4-3, 2-1 signal passage 262 is connected with the 2-3 shift valve 268 and with a 3-4 shift valve 270.

The 1-2 shift valve 266 has a valve spool 272 having equal diameter spaced lands a, b and c slidably disposed in a valve bore 274, a compression spring 276 compressed between one end of valve bore 274 and valve land a and a plug valve 278 slidably disposed in a bore 280 adjacent to the end of valve land c. The valve bore 274 is connected with the range clutch apply passage 64, a first exhaust passage 282, a first ratio engage passage 284, the 2-4 range clutch apply passage 112, a second exhaust passage 286 and a 2-1 shift signal passage 288. In the position shown, the first ration engage passage 284 is connected with the range clutch apply passage 64 such that the first ratio friction establishing device will be engaged to place the mechanical transmission in the first gear ratio. When a shift signal is present in the 1-2 passage 258, the valve spool 272 will be moved to the left to connect passage 64 to the 2-4 range clutch apply passage 112, and the first ratio engage passage 284 will be connected to the first exhaust passage 282, The 2-4 range clutch apply passage 112 is also connected to the valve bore 280 adjacent to the need of plug valve 278 such that when the passage 112 is pressurized, the end of plug valve 278 is pressurized to hold the valve spool 272 in the upshifted position so that the 1-2 shift signal in passage 258 does not have to be maintained after the shift has been completed. The first exhaust passage 282 is connected with a first trip valve 290, the first engage passage 284 is connected with a second trip valve 292, a third trip valve 294 and a fourth trip valve 296. The 2-1 shift signal passage 288 is connected with the 2-3 shift valve 268.

The 2-3 shift valve 268 has a valve spool 298 having equal diameter spaced lands a, b, c, d and e slidably disposed in a valve bore 300. A compression spring 302 compressed between one end of bore 300 and the valve land a, a plug valve 304 abutting valve land e and slidably disposed in a valve bore 306. The valve bore 300 is connected with the 2-4 range clutch apply passage 12, the 1-2, 3-4 signal passage 258, the 2-3 signal passage 260, the 2-1 shift signal passage 288, the 3-2 signal passage 264, the 2-1, 4-3 signal passage 262, the second ratio engage passage 180, a 3-4 range clutch apply passage 308, a third exhaust passage 310, and a 3-4 shift signal passage 312. In the position shown which is the downshift position, the 2-4 range clutch apply passage 112 is connected with the second ratio engage passage 180 such that if the the 1-2 shift valve 266 is upshifted, the passage 112 will be pressurized and the second ratio engaging device will be engaged. When a 2-3 shift signal from the ratio shift signal valve 96 is present in passage 260, the valve spool 298 will be moved to the left against spring 302, thereby connecting the 2-4 range clutch apply passage 112 to the 3-4 range clutch apply passage 308 which passage is also connected to bore 306 at the end of plug valve 304 to maintain the 2-3 shift valve in the upshifted position, the second ratio engage passage 180, will be connected to the second exhaust passage 286. When a 3-2 downshift signal is present in 3-2 signal passage 264, the valve spool 298 will be moved to the spring set position shown to connect the passage 112 to the passage 180 and to connect the 3-4 range clutch apply passage to the third exhaust passage 310.

The 3-4 shift valve 270 has a valve spool 314 having equal diameter spaced lands a, b and c slidably disposed in a valve bore 316, a compression spring 318 compressed between one end of valve bore 316 and the valve land a, and a plug valve 320, slidably disposed in a valve bore 322 adjacent valve land c. The valve bore 316 is connected with the 3-4 signal passage 312, the 3-4 range clutch apply passage 308, the third exhaust passage 310, the 2-1 signal passage 262, the third ratio engage passage 182, the fourth ratio engage passage 184, and a fourth exhaust passage 324. In the downshift position shown, the passage 308 is connected to third ratio engage passage 182 to permit engagement of third ratio friction drive establishing device whenever the 1-2 and 2-3 shift valves are in the upshifted position. When a 3-4 shift signal is present in the 3-4 signal passage 312, the valve spool 314 will be moved to the left against spring 318 to connect fourth ratio engage passage 184 to the 3-4 range clutch apply passage 308 to permit the fourth ratio friction establishing device to be engaged, and to connect the third ratio engage passage 182 to the third exhaust passage 310. The fourth ratio engage passage 184 is also connected to the bore 322 to permit fluid pressure to operate on the plug valve 320 to hold the spool 314 in the upshifted position so that the 3-4 shift signal is passage 312 does not have to be continuous. If a 4-3 downshift signal is present in the passage 262, the valve spool 314 will be moved to the downshifted position shown thereby connecting passages 308 and 182 to engage the third ratio friction drive establishing device while connecting the forth ratio engage passage 184 to the fourth exhaust passage 324.

The first trip valve 290 has a valve spool 326 having two equal diameter lands a and b slidably disposed in a valve bore 328, a pair of plug valves 330 and 332 also slidably disposed in valve bore 328 and a compression spring 334 compressed between one end of valve bore 328 and valve land a to urge the valve spool 326 and the plug valve 330 and 332 to the position shown. The valve bore 328 is connected through a restriction 336 with the range clutch apply passage 64. A valve bore 328 is also connected to the second ratio engage passage 180 between land b and plug valve 330, the third ratio engage passage 182 between plug valves 330 and 332, the fourth ratio engage passage 184 adjacent to the end of plug valve 332, the first exhaust passage 282, and an exhaust passage 338. In the position shown which is the first gear ratio position, the first exhaust passage 282 is connected with the range clutch apply passage 64 so that initially upon an upshift of the 1-2 shift valve 266, the first ratio engaging device will remain presurized until the second ratio engaging device reaches a predetermined pressure level. As the pressure level in the second ratio engaging device increases, the pressure in passage 180 will increase until a sufficient pressure level is achieved to overcome the force in the spring 334. When this pressure level is achieved, the valve spool 326 will be moved to the left thereby connecting the first exhaust passage 282 to the exhaust passage 338 to exhaust the first ration engaging device, The first trip valve 290 will also be in the upshifted position whenever the third or fourth ratio engaging devices are engaged.

A second trip valve 292 has a valve spool 340 having two equal diameter spaced lands a and b slidably disposed in a valve bore 342, a pair of plug valve 344 and 346 also slidably disposed in the valve bore 342 and a compression spring 348 compressed between one end of valve bore 342 and valve land a. In the position shown, which is the second gear or neutral position, the range clutch apply passage 64 is connected through a restriction 350 with the second exhaust passage 286. Upon an upshift to the third gear ratio when the pressure is available in passage 182 or a downshift to the first gear ratio when pressure is available in passage 284, the second exhaust passage 286 will remain pressurized until the pressure in passage 182 or 284 is sufficient to overcome the spring 348 therefore insuring engagement of the oncoming friction device at which time a valve spool 340 will be shifted against the spring 348 to connect the second exhaust passage 286 to the exhaust 338 thereby disengaging the second ratio engagement device.

The third trip valve 294 has a valve spool having equal diameter spaced lands a and b slidably disposed in a valve bore 354, a pair of plug valves 356 and 358 also slidably disposed in valve bore 354 and a compression spring 360 compressed between one end of bore 354 and the valve land a. The third trip valve as shown is in the third gear or neutral position such that the 2-4 range clutch apply passage 112 is connected to the third exhaust passage 310 to maintain the third ratio establishing device engaged during the initial portion of an upshift or downshift from third ratio as described above for the first and second trip valves.

A fourth trip valve 296 has a valve spool 362 having equal diameter spaced lands a and b slidably disposed in a valve bore 364, a pair of plug valves 366 and 368 also slidably disposed in vale bore 364, and a compression spring 370 compressed between one end of bore 364 and valve land a. In the spring set position shown which is the fourth gear or neutral position, the 2-4 range clutch apply passage 112 is connected to the fourth exhaust passage 324 to maintain the fourth ratio establishing device engaged upon an initial downshift of the 3-4 shift valve. However, when the pressure in the oncoming third ratio engaging device is sufficient to overcome the force of spring 370, the valve spool 362 will be shifted to the left against the spring 370 to connect the fourth exhaust passage 324 to the exhaust 338. All the trip valves 290, 292, 294 and 296 are provided with connections such that they will be in their shifted positions whenever their respective ration establishing device is not engaged. The exhaust passage 338 is connected through a restriction 373 with the range clutch apply passage 64, to insure that passage 338 is filled with fluid and to exhaust through a low pressure relief valve 372 to maintain the exhaust passage 338 at a low pressure level.

The shift signal valve 26 has a valve spool 374 with two equal diameter spaced lands a and b slidably disposed in a valve bore 376. The valve spool has a rod extension 378 which extends beyond the valve bore 376 and adapted to be connected by linkages not shown to the servo 236. The rod 378 is connected to the servo in such a manner that when the actuator piston 230 moves in the direction of arrow A, the valve spool 374 will move in the direction of arrow B. The valve bore 376 is connected at its approximate longitudinal center to the main pressure passage 12. The plus signal passage 88 is connected near the right end of the valve bore 376 while the minus signal passage 90 is connected near the left end of the bore 376. As the valve spool 374 is moved by the servo 236, the land b will be moved a sufficient amount so that main pressure passage 12 will be open to the plus signal passage 88. When the plus signal passage 88 is opened to main pressure, a plus signal will be distributed by the control system through the reverse signal valve 22 to ratio shift signal valve 96 to cause appropriate changes in the shift valves depending upon the direction and ratio the transmission is operating in when the plus signal becomes available. After a shift occurs, the actuator piston 230 will be reversed and will move opposite to the direction of arrow A which will cause the valve spool 374 to move opposite to the direction of arrow B, this motion will continue until the land a opens the minus signal passage 90 to the main pressure passage 12. The minus signal will be distributed by the control system through the reverse signal valve 22 to ratio shift signal valve 96 to cause appropriate changes in the shift valves depending upon the condition of the transmission when the minus signal becomes available.

The position control valve 196 includes a valve spool 380 having spaced lands *a* and *b* slidably disposed in a bore 382 of a sleeve member 384. The sleeve member 384 is slidably disposed in a valve bore 386 as is a reverse plug valve 388. The valve spool 380 has a rod extension 390 which is connected by linkage not shown to the servo 236 to cause it to move in the direction of arrow C whenever the actuator moves in the direction of arrow A. The valve bore 386 is connected to the neutral low return passage 194, the low reverse return passage 224 and the low forward return passage 216. The sleeve member 384 is urged to the position shown by a compression spring 392 compressed between a shoulder 394 on the sleeve 384 and a shim washer 396 which is located in the valve by a snapring 398. This position control valve 196 functions to provide a fixed creep in the transmission during operation in the low drive range in either forward or reverse drive. A more complete description of the operation of this valve can be seen in U.S. Ser. No. 875,424, filed Nov. 10, 1969. It will be sufficient for the purpose of this disclosure to merely state that it will provide a fixed amount of creep in both a forward and reverse direction in low range operation.

The servo 236 is conventional rotary-type servo adapted to deliver fluid to a variable displacement hydraulic pump which is shown diagrammatically at 400. The servo 236 receives fluid pressure from a control pump 402 through the pressure passage 404. The control pressure is established by a regulator valve 406. The servo functions such that as the inner spool 408 is rotated clockwise, control pressure is distributed from passage 404 through a passage 410 to a control piston 412 which will cause the pump 400 to change displacement. As the pump changes displacement, the outer sleeve 414 will be driven by the swash plate 416 to cause it to rotate clockwise to block the fluid flow from passage 404 to the control piston 412 when the desired displacement has been reached. Of the spool 408 is rotated counterclockwise, fluid pressure will be distributed to a passage 418 to a control piston 420 to cause the pump to change displacement in the opposite direction. Again the outer sleeve 414 will be driven by the swash plate 416 until the desired displacement is achieved and the pressure connections between passage 404 and passage 418 are closed.

The steer override signal valve 36 has a spool 430 having a single diameter land *a* and a double diameter land *b*. The land *a* and a portion of land *b* are slidably disposed in a valve bore 432 while the other portion of land *b* is slidably disposed in a valve bore 434. The bores 432 and 434 are formed concentrically in a sleeve member 436 which is secured in a valve body 438. The sleeve 436 an inlet port 440 in fluid communication with the charge passage 30, an outlet port 442 and an exhaust port 444. The outlet port 442 is connected via a passage 446 to a steer override control 448. A compression spring 450 is compressed between one end of the valve body 438 and the end of valve land *b* to urge the valve spool 430 to the right against a governor plug valve 452. The governor plug valve has two lands *a* and *b* slidably disposed in valve bores 454 and 456 respectively. One end of bore 456 is connected to the engine governor passage 132 and receives an engine governor signal therefrom which acts on the end of valve land *b*. The valve land *a* has a button portion which abuts the valve spool 430 to bias the valve spool 430 to the left when engine governor pressure is available. The differential area between bores 432 and 434 is communicated with the space between lands *a* and *b* of valve spool 430 by a diagonal passage 458. Thus upon admission of charge pressure to port 440, the fluid will be directed to the outlet port 442 and also through passage 458 to the differential area between the two bores to act on the differential area between the two diameters of valve land *b*. The pressure acting on the differential area will move the valve spool 430 to the left to block port 440 with land *a* and open port 444 with land *b* and thereby regulate the fluid pressure in the outlet port 442. As engine governor pressure increases, thereby signaling an increase in engine speed, the regulator pressure will decrease since the engine governor bias is in the same direction as the differential area force on the valve spool 430. When the engine governor pressure has reached a predetermined level, the valve land *a* will continuously close the port 440 so that further regulated pressure in port 442 will not be available.

The steer override 448 has a piston member 460 slidably disposed in a bore 462 of a sleeve member 464. The piston member 460 has two ports 466 and 468 which are in fluid communication with recessed areas 470 and 472 respectively on the outer diameter of the piston 460. The sleeve 464 has an inlet port 474 in fluid communication with passage 446 and a pair of exhaust ports 476 and 478 An input rod 480 is operatively connected to the piston 460 by a spring 482 such that when the input rod 480 is moved by a steer input control 484, the piston 460 will be moved. The left end of piston 460 has a groove 486 which is operatively connected with a servo input 488 drivingly secured to the inner member 490 of a rotary servo 492, As the input rod 480 is moved and the piston 460 moves with it, the port 468 or 466 becomes open to the passage 446 such that if fluid pressure is present from the steer override signal valve 36, the fluid pressure will be communicated to a chamber 494 or 496. Fluid pressure in chamber 494 will act on the inner left end of the piston 460 and on the left end of the input rod 480 to cause the piston to move relative to the rod 480 and thereby move the servo member 490 toward the center position. Pressure entering the chamber 496 will act on the right inner end of piston 460 and the input rod 480 to move the piston 460 to the right relative to the rod 480 and also return the servo member 490 to the center position. This steer override feature prevents the operator from steering the vehicle when there is not sufficient engine power available to permit steering as requested by steer input 484.

The operator input 484 is also connected to a steer centering mechanism 498 which includes a rod 500 operatively connected to the steer member 484, a pair of compression springs 502 and 504. The spring 504 is compressed between a shoulder 506 on the rod 500 and a spring seat slidably disposed on the left end of rod 500. The movement of the spring seat on rod 500 is limited by a fastener 510 and by a snapring 512 secured in the transmission case. The fastener 510 is used to adjust the springs 502 and 504 to obtain a zero steer condition at spring center. The spring 502 is located between the spring seat 508 and the shoulder 514 on the transmission case. These two springs 502 and 504 function such that a centering force is always present on the steer input member 484 whether the rod 500 is moved to the left or to the right. When the rod 500 is moved to the left, the spring 504 provides the centering force and when the rod 500 is moved to the right, the spring 502 provides the centering force.

The servo 492 is similar in construction to the servo 236 and has an outer sleeve member 516 which is operatively connected by linkage, not shown, to a swashplate 518 of the hydraulic pump, in the steer system of the transmission. The servo 492 receives control pressure from the pump 402 via passage 404 and distributes the fluid pressure via passages 520 and 522 to displacement control motors 524 and 526 respectively. If a right steer is desired, the input member 484 is rotated counterclockwise thereby rotating the center member 490 counterclockwise to exhaust passage 520 and pressure passage 522 such that the control motor 526 will cause a displacement change in the hydraulic pump. If a left steer is desired, the passage 520 will be pressurized while the passage 522 is exhausted to cause pressurization of the control motor 524 and a change in the pump displacement in the desired direction. The ports of the steer pump are designated 528 and 530 and are connected via passages 532 and 534 to a bypass and relief valve 536. The bypass and relief valve has a plug valve 538 slidably disposed in a bore 540 and another plug valve 542 slidably disposed in a bore 544. The plug valve 538 has a conical end 546 which seats in a port 548 which is connected to the passage 534. The passage 532 is also connected to the bore 540, however, the seating of the conical portion 546 prevents fluid communication between the passages 532 and 534. However, if the pressure in the passage 534 should increase above a predetermined amount which is established by mainline pressure acting on the one end of valve plug 542 to bias the plug valve 538 to the closed position. The plug valve 538 will open permitting fluid communication between the passages 534 and 532 to relieve the high pressure in port 530. If high pressure in passage 532 should occur, it will act upon a differential diameter 550 on the plug valve 538 to again open communications between the passage 532 and 534 to permit pressure relief of the port 528. The pressure in passage 46 is controlled by pivot eliminate valve 18. In the neutral position, main pressure 12 is blocked at the pivot eliminate valve 12 by land b and therefore the pressure in the bypass and relief passage 46 would be zero and the bypass and relief valve 536 would open at minimum pressure in the steer system. However, if the solenoid E is not energized, such as in any drive other than neutral, the valve spool 38 will move to the right against the spring 42 to permit fluid communication between passages 12 and 46 to admit mainline pressure to the bore 544 and thus establish a maximum system pressure in the steer system.

When the transmission is conditioned for neutral, the solenoids A and E are energized so that the neutral automatic valve 20 and the pivot eliminate valve 18 will be in the position shown. When a forward or reverse drive is selected, solenoid B and solenoid C or D are engaged.

Assuming the transmission is conditioned for forward drive and an advance signal is present, the actuator 228 will move to the right to operate the servo 236 thereby causing the plus-minus signal valve 26 to move to the right. The propulsion servo will be rotated so as to cause the pump displacement to increase in a positive direction. As the pump displacement increases, the vehicle speed will increase. When the pump displacement has reached a predetermined positive angle such as 18 degrees, displacement pressure will communicate through the plus-minus shift signal valve 26 to the plus signal passage 88 which is connected to the reverse signal valve 22. The plus signal passage is connected through the reverse signal valve 22 to the 1-2-1 signal passage 84 which is connected to the ratio shift signal valve 96. With an advance signal present, the ratio shift valve will be moved to the left thereby connecting the 1-2- shift signal passage 84 to the 1-2 signal passage 258 which directs a pressure signal to the end of the 1-2 shift valve 266. The 1-2 shift valve 266 will therefore move to the left against the spring 276 thereby connecting the first engage passage 284 to first exhaust passage 282 and the range clutch apply passage 64 to the 2-4 range clutch apply passage 112. As the 2-4 range clutch apply passage 112 is pressurized, the second ratio friction device will also be pressurized through the 2-3 shift valve 268. Also, as the 2-4 range clutch apply passage 112 is pressurized, the solenoid regulator valve will receive an additional bias to provide a decrease in solenoid regulator pressure to inhibit transmission mode shifts when the transmission is not conditioned for low range. Therefore, a shift from forward drive or reverse drive cannot be made unless the transmission is in low. The governor feed regulator valve 24 will also receive an additional bias to provide an increase in governor regulator pressure up to line pressure to provide fast governor response at higher drive ratios. The governor supply pressure reduction in low range provides improved stability in low with fast response in other ranges. The null valve 164 will be moved downward against the spring 190 thereby connecting the return passage 162 to the 2-4 return passage 192 and connecting the neutral low return passage 194 to exhaust thereby effectively removing the position valve 196 from the system.

As the second engage passage 180 is pressurized the first trip valve 290 will be moved to the left against the spring 334 thereby disconnecting the first exhaust passage 282 from the range clutch apply passage 64 and connecting the passage 282 to the exhaust passage 338. With the passage 282 connected to exhaust, and the 1-2 shift valve 266 moved to the left, the first ratio friction device will be connected to exhaust thereby disestablishing the first drive while the second ratio friction device is engaged to establish the second drive. Also, as the second ratio device is engaged, the clutch signal valve 98 will be moved downward against the spring 174 thereby connecting the forward signal passage 92 to the 2,4 signal passage 178 which causes the actuator valve 186 to move downward against the spring 202 so that the advance passage 60 is disconnected from the 1,3 advance passage 206 and is connected to the 2,4 advance passage 204 which advance passage directs fluid through the actuator shuttle valve 208 to the right side of the actuator piston 230. Thus, as the advance signal continues, the actuator piston 230 will cease to move to the right and will begin moving to the left. As the actuator piston 230 begins to move to the left, the plus shift signal will be discontinued thereby discontinuing the 1-2-1 signal which was directed to the 1-2 shift valve 266. However, the 1-2 shift valve 266 will maintain its upshifted position since the 2-4 range clutch apply passage 112 is connected to the right end of the shift valve to hold it in the upshift position. The actuator piston 230 will continue to move to the left, as long as an advance signal is present, until the plus-minus shift signal valve 26 is moved sufficiently to the left to connect mainline pressure to the minus shift signal passage 90. When the minus shift signal passage 90 is pressurized, the minus signal is directed through the reverse signal valve 22 to the 2-3-2 shift signal passage 86 and then via the ratio shift signal valve 96 to the 2-3 signal passage 260. Pressure in the signal passage 260 operates on the right end of the 2-3 shift valve 268 causing the valve to upshift thereby disconnecting the second engage passage 180 from the 2-4 range clutch apply passage 112 while connecting it to the second exhaust passage 286. Also, on upshift, the 2-4 range clutch apply passage 112 is connected to the 3-4 range clutch apply passage 308. The second ratio friction device will continue to be pressurized since the second exhaust passage 286 is pressurized through the second trip valve 292 via the range clutch apply passage 64. However, when the 3-4 range clutch apply passage 308 is pressurized as described above, the third ratio friction device will be pressurized through the 3-4 shift valve 270 thereby pressurizing the third engage passage 182 so that the second trip valve 292 will be moved to the left against the spring thereby disconnecting the second exhaust passage 286 from the range clutch apply passage 64 while connecting it to exhaust passage 338. With the second exhaust passage 286 connected to exhaust, the second ratio friction device will be exhausted. Also, as the third ratio friction device is pressurized, the clutch signal valve 98 will be moved upward thereby connecting forward signal to the 1,3 signal passage 176 which is connected to the actuator valve 186 to cause that valve to move upward so that the advance passage 60 will be disconnected from the 2,4 advance passage 204 and connected to the 1,3 advance passage 206.

The 1,3 advance passage 206, as described above for low ratio, is connected via the shuttle valve 210 to the left end of the actuator piston 230. Therefore as the advance signal continues, the actuator will cease its leftward movement and begin moving to the right. As the actuator piston moves to the right, the minus shift signal will be discontinued and the actuator will continue to move to the right with an advance signal until the plus shift signal is again connected to mainline pressure. The introduction of the positive shift signal will cause pressurization of the 1-2-1, 3-4-3 shift signal passage 84 through the reverse signal valve 22 and the 1-2,3-4 signal passage 258 through the ratio shift signal valve 96 so that the 3-4 shift valve 270 will be upshifted thereby connecting the fourth engage passage 184 to the 3-4 range clutch apply passage 308 while connecting the third engage passage 182 to the third exhaust passage 310. As described above for the 2-3 shift, the third ratio friction device will remain engaged until sufficient pressure is built up in the fourth ratio engaging device to cause the third trip valve 294 to shift thereby connecting the third exhaust passage 310 and the third ratio friction device to exhaust via exhaust passage 338.

As the fourth ratio device is engaged, the clutch signal valve 98 and the actuator valve 186 will shift as described above for second ratio thereby connecting the advance passage 60 through the actuator valve 186 to the 2,4 advance passage 204 which is connected via shuttle valve 208 to the right side of the actuator piston 230. As the advance signal continues, the actuator piston 230 will move to the left to provide further increase in drive ratio in the fourth ratio until maximum vehicle speed is obtained or the ratio governor ceases to generate an advance signal. The movement of the piston 230 in the bore 232 can be limited to the stroke desired at the shift point by permitting it to abut the ends of bore 232 or by providing adjustable stops in the bore 232. Thus the position of the piston 230 will remain fixed during a shift thereby maintaining the pump 400 at a constant displacement during the shift.

With the control system conditioned for the fourth ratio as described above, the vehicle speed may be decreased either by the operator decreasing the throttle setting or by the vehicle starting up a grade thereby imposing an increased load on the engine. As the engine speed decreases to less than the desired speed for a given throttle setting, a return signal is generated at the ratio governor 116 which signal is directed through the neutral shuttle valve 156, to the null valve 164 which is held against the spring by pressure in the 2–4 range clutch apply passage 112. The return signal passages through the null valve 164 to the 2–4 return passage 192 which is connected through the actuator valve 186 held in its downward position by pressure in the 2,4 signal passage 178 to the 1,3 advance passage 206 which passage directs pressure through the shuttle valve 210 to the left side of the actuator piston 230. The return signal causes the actuator to move to the right thereby decreasing the drive ratio in fourth range. The actuator will continue to move to the right until a plus signal is present at the shift signal valve 26. The plus signal is directed through the reverse signal valve 22 to the 1–2–1, 3–4–3 shift signal passage 84 which is connected with the ratio shift signal valve 96. Since a return signal is present, the ratio shift signal valve 96 has been shifted to the right against the spring 244 is that the 1–2–,3–4–3 shift signal passage 84 is connected to the 2–1,4–3 signal passage 262. A shift signal in the 2–1,4–3 signal passage 262 is directed to the left end of the 3–4 shift valve 270 thereby causing the shift valve to move to the downshifted position which connects the 3–4 range clutch apply passage 308 to the third engage clutch passage 182 and connects the fourth engage passage 184 to the fourth exhaust passage 324.

The fourth ratio device will remain engaged and fed by pressure from the 2–4 range clutch apply passage 112 through the fourth trip valve 296 until the pressure in the third ratio device is increased sufficiently to shift the fourth trip valve 296 at which time the fourth exhaust passage 324 will be connected to exhaust passage 338 thereby exhausting the fourth ratio device. When the fourth ratio device is disengaged and the third clutch is engaged, the clutch signal valve 98 will move to the spring set position shown, thereby connecting the 2,4 signal passage 178 to the reverse signal passage 92 and to exhaust through the reverse signal valve 22. The actuator valve 186 will then move to the spring set position shown to connect the 2–4 return passage 192 to the 2,4 advance passage 204 which directs fluid through the shuttle valve 208 to the right side of the actuator piston 230 to move the actuator piston 230 to the left thereby decreasing the drive ratio in the third range. When the actuator piston 230 has moved sufficiently to the left, the shift signal valve 26 will connect main line to the minus shift signal passage 90 thereby directing a minus shift signal through the reverse signal valve 22 to the 2–3–2 shift signal passage 86 and then through the ratio shift signal valve 96 to the 3–2 signal passage 264 and to the left end of the 2–3 shift valve 268. The shift signal in the 3–2 signal passage will cause the 2–3 shift valve to downshift thereby connecting the second ratio device to the 2–4 range clutch apply passage 112 and the third ratio device to the third exhaust passage 310. The third ratio device will continue to be fed through the 2–4 range clutch apply passage 112 and the third exhaust passage 310 by way of the third trip valve 294 until the second ratio device pressure has developed sufficiently to cause the third trip valve 294 to shift against the spring 360 thereby connecting the third exhaust passage 310 to exhaust passage 338.

As the second ratio device is engaged and the third ratio device is disengaged, the clutch signal valve 98 will downshift connecting the forward signal passage 94 to the 2,4 signal passage 178 which will cause the actuator valve 186 to shift against the spring 202. With the actuator valve 186 in the shifted position, the 2–4 return passage 192 will be connected to the 1,3 advance passage 206 which is directed through the shuttle valve 210 to the left side of the actuator piston 230. As the return signal continues, the actuator piston 230 will move to the right until the shift signal valve 26 is moved sufficiently to the right to connect main line to the plus shift signal which is directed through the reverse signal valve 22 to the 1–2–1,3 –4–3 shift signal passage 84 which continues on through the ratio shift signal valve 96 to the 2–1 signal passage 262 which is directed through the 2–3 shift valve 268 to the left end of the 1–2 shift valve 266 to cause the 1–2 shift valve 266 to downshift. With the 1–2 valve downshifted, the first ratio device will be pressurized by the range clutch apply passage 64 and the second ratio device will be connected through the second exhaust passage 286 and the second trip valve 292 to the range clutch apply passage 64. The second ratio device will remain engaged, until pressure in the first ratio device develops sufficiently to shift the second trip valve 292 thereby connecting the second exhaust passage 286 to exhaust passage 338 to exhaust the second ratio device. The control system will continue to operate in low ratio until the actuator is in the neutral position shown at which time the vehicle will be at rest.

The operation in reverse is similar to operation in forward. During reverse operation, the forward-reverse valve 34 will be shifted to reverse when solenoid D is energized. This will exhaust the forward clutch while engaging the reverse clutch. As the reverse clutch is engaged, the reverse signal valve will be shifted to the reverse position by pressure in reverse passage 76. This will exhaust the forward signal passage 94 and connect the reverse signal passage 92 with main passage 12. During reverse operation, the actuator piston 230 will move in the opposite direction in each range, that is in low range the piston 230 will move to the left. The shift sequence and the distribution of shift signals is the same as forward operation.

The ratio friction establishing devices are conventional fluid-operated clutches and brakes which are operated in a known manner to control the mechanical gear ratios in a known hydromechanical transmission such as that disclosed in the U.S. Pat. to Mooney, Jr. et al. No. 3,426,621.

The above description and drawings are directed to the embodiment shown and are not intended as limitations of the invention since obvious modifications and variations will be readily apparent to those skilled in the art.

What is claimed is:

1. A control for use with a hydromechanical transmission having a hydrostatic portion with a variable displacement hydrostatic drive pump and a plurality of fluid operated ratio establishing means being selectively operable for controlling a plurality of mechanical gear ratios, said control comprising fluid pressure source means for providing fluid pressure; ratio governor means operatively connected with said source means for providing advance and return signals; displacement control means operatively connected with said ratio governor means for controlling the displacement of the hydrostatic drive pump in response to the advance and return signals; shift signal means operatively connected with said source means and said displacement control means for distributing shift signals at predetermined hydrostatic drive pump displacements; and shift valve means operatively connected to said shift signal means and the ratio establishing means for providing selective interchange in the ratio establishing means in response to the shift signals.

2. A control for use with a hydromechanical transmission having a hydrostatic portion with a variable displacement pump and a plurality of fluid operated drive ratio establishing means being selectively operable for controlling a plurality of forward and reverse drive ranges including a low range, said control comprising fluid pressure source means for providing fluid pressure; ratio governor means operatively connected with said source means for providing advance and return signals; regulator means between said source means and said ratio governor means for regulating the inlet pressure to said ratio governor means below the level of the source means in the low range; control means on said regulator means for disabling said regulator means in drive ranges other than low range; displacement control means operatively connected with said ratio governor means and said variable displacement pump for controlling the displacement of the variable displacement pump in response to the advance and return signals; shift signal means operatively connected with said source means and said displacement control means for distributing shift signals at predetermined displacements of said variable displacement pump; and shift valve means operatively connected to said shift signal means and the drive ratio establishing means for providing selectively interchange of the drive ratio establishing means in response to the shift signals.

3. A control for use with a hydromechanical transmission having a hydrostatic portion with a variable displacement pump and a plurality of fluid operated drive ratio establishing means, said control comprising fluid pressure source means for providing fluid pressure; ratio governor means operatively connected with said source means for providing advance and return signals; displacement control means including actuator means operatively connected with said ratio governor means and being movable in response to the advance and return signals and servo control means operatively connected with the variable displacement pump and the actuator means for controlling the displacement of the variable displacement pump in response to movement of the actuator means; shift signal means operatively connected with said source means and said servo control means for distributing shift signals at predetermined displacements of said variable displacement pump; and shift control valve means operatively connected to said shift signal means, said ratio governor means, and the drive ratio establishing means including ratio shift signal means movable to advance and return positions in response to said advance and return signals for directing the shift signals, shift valve means in fluid communication with the ratio shift signal means and being shiftable in response to the shift signals for providing selective interchange of the drive ratio establishing means, and trip valve means in fluid communication with the shift valve means for maintaining the offgoing drive ratio establishing means engaged until the oncoming drive ratio establishing means is engaged.

4. A control for use with a hydromechanical transmission having a hydrostatic portion with a variable displacement pump and a plurality of fluid operated drive ratio establishing means for providing a plurality of forward and reverse drive ranges including a low drive range, said control comprising fluid pressure source means for providing fluid pressure; ratio governor means operatively connected with said source means for providing advance and return signals; regulator means between said source means and said ratio governor means for regulating the inlet pressure to the governor means during the low drive range; displacement control means including actuator means operatively connected with said ratio governor means and servo control means operatively connnected with the actuator means and variable displacement pump for controlling the displacement of the variable displacement pump in response to the advance and return signals; shift signal means operatively connected with said source means and said servo control means for distributing shift signals at predetermined displacements of the variable displacement pump; and shift control valve means operatively connected to said shift signal means, said ratio governor means, and the drive ratio establishing means including ratio shift signal means movable to advance and return positions in response to said advance and return signals for directing the shift signals, shift valve means in fluid communication with the ratio shift signal means and being shiftable in response to the shift signals for providing selectively interchange of the drive ratio establishing means, and trip valve means in fluid communication with the shift valve means for maintaining the offgoing drive ratio establishing means engaged until the oncoming drive ratio establishing means is engaged.

5. A control for use with a hydromechanical transmission having a hydrostatic portion with a variable displacement pump and a plurality of fluid operated drive ratio establishing means, said control comprising fluid pressure source means for providing fluid pressure; ratio governor means operatively connected with said source means for providing advance and return signals; displacement control means operatively connected with said ratio governor means for controlling the displacement of the variable displacement pump in response to said advance and return signals; shift signal means including a valve bore having an inlet port in fluid communication with said source means, a first outlet port and second outlet port, a valve spool means slidably disposed in the bore and being operatively connected with said displacement control means for selectively distributing shift signals from said inlet port to said first and second outlet ports at predetermined displacements of said variable displacement pump; and shift valve means operatively connected to said shift signal means and the drive ratio establishing means for providing selectively interchange of the drive ratio establishing means in response to the shift signals.

6. A control for use with a hydromechanical transmission having a hydrostatic portion with a variable displacement pump and a plurality of fluid operated drive ratio establishing means for controlling a plurality of mechanical gear ratios for providing a plurality of forward and reverse drive ranges including a low range, said control comprising fluid pressure source means for providing fluid pressure; ratio governor means operatively connected with said source means for providing engine overspeed the engine underspeed signals; regulator means between said source means and said ratio governor means for regulating the inlet pressure to said ratio governor means below the level of the source means in the low range; control means on said regulator means for disabling said regulator means in drive ranges other than low range; displacement control means operatively connected with said ratio governor means for controlling the displacement of the variable displacement pump; shift signal means operatively connected with said source means and said displacement control means for distributing shift signals at predetermined displacement of said variable displacement pump; and shift means operatively connected to said shift signal means and the drive ratio establishing means for providing selective ratio changes in the mechanical gearing in response to the shift signals including a shift signal valve having a valve bore, a valve spool slidably disposed in said valve bore, and means adjacent the ends of said valve spool in fluid communication with said ratio governor for moving the valve spool in one direction in response to the engine overspeed signal and in another direction in response to the engine underspeed signal.

7. A control for use with a hydromechanical transmission having a hydrostatic portion with a variable displacement pump and a plurality of fluid operated drive establishing means for selectively controlling a plurality of mechanical gear ratios, said control comprising fluid pressure source means for providing fluid pressure; ratio governor means operatively connected with said source means for providing advance and return signals; displacement control means operatively connected with said ratio governor means and said variable displacement pump for controlling the displacement of the variable displacement pump; shift signal means including a valve bore having an inlet port in fluid communication with said source means, a first outlet port and second outlet port, a valve spool means slidably disposed in the bore and being operatively connected with said displacement control means for selectively distributing shift signals from said inlet port to said first and second outlet ports at predetermined pump displacements; and shift valve means operatively connected to said shift signal means and the drive establishing means for providing selectively ratio changes in the mechanical gearing in response to the shift signals including a shift signal valve having a valve bore, a valve spool slidably disposed in said valve bore, and hysteresis means adjacent the ends of said valve spool in fluid communication with said ratio governor for moving the valve spool in one direction in response to the advance signal and in another direction in response to the return signal.

8. A control for use with a hydromechanical transmission having a hydrostatic portion with a variable displacement pump and a plurality of fluid operated drive ratio establishing means for selectively controlling a plurality of mechanical gear ratios for providing a plurality of forward and reverse drive ranges including a low range, said control comprising fluid pressure source means for providing fluid pressure; ratio governor means operatively connected with said source means for providing engine overspeed and engine underspeed signals; regulator means between said source means and said governor means for regulating the inlet pressure to said governor means below the level of the source means in the low range; control means on said regulator means for disabling said regulator means in drive ranges other than low range; displacement control means operatively connected with said ratio governor means for controlling the displacement of the variable displacement pump; shift signal means including a valve bore having an inlet port in fluid communication with said source means, a first outlet port and second outlet port, a valve spool means slidably disposed in the bore and being operatively connected with said displacement control means for selectively distributing shift signals from said inlet port to said first and second outlet ports at predetermined displacements of said variable displacement pump; and shift valve means operatively connected to said shift signal means and the drive ratio establishing means for providing selective ratio changes in the mechanical gearing in response to the shift signals including a shift signal valve having a valve bore, a valve spool slidably disposed in said valve bore, and hysteresis means adjacent the ends of said valve spool in fluid communication with said ratio governor for moving the valve spool in one direction in response to the engine overspeed signal and in another direction in response to the engine underspeed signal.

PO-1050
(5/69)

UNITED STATES PATENT OFFICE
CERTIFICATE OF CORRECTION

Patent No. 3,611,838   Dated October 12, 1971

Inventor(s)   Robert C. Utter

It is certified that error appears in the above-identified patent and that said Letters Patent are hereby corrected as shown below:

```
Column  2, line 72, "63" should be -- 62 -- ;
Column  3, line 37, "c" should be -- C -- ;
           line 58, "84" should be -- 94 -- ;
           line 60, delete "valve" and insert -- the -- ;
           line 61, delete "spaced" and insert -- connected -- ;
Column  5, line 69, "318" should be -- 218 -- ;
Column  6, line 40, "ration" should be -- ratio -- ;
           line 44, before passage insert -- signal -- ;
           line 49, "need" should be -- end -- ;
           line 66, "12" should be -- 112 -- ;
           line 74, after if delete "the" (repeated);
Column  7, line 12, after passage insert -- 308 -- ;
           line 37, "is" should be -- in -- ;
           line 69, "ration" should be -- ratio -- ;
Column  8, line 31, "vale" should be -- valve -- ;
           line 43, "ration" should be -- ratio -- ;
           line 51, after spool insert -- 374 -- ;
Column  9, line 39, "Of" should be -- If -- ;
           line 54, after 436 insert -- has -- ;
Column 10, line 14, after sleeve insert -- member -- ;
           line 65, "pressure" should be -- pressurize -- ;
Column 11, line 40, "displacement" should be -- mainline -- ;
           line 47, before shift "1-2-" should be -- 1-2-1 -- ;
Column 13, line 29, "passages" should be -- passes --;
           line 42, "is" should be -- so -- ;
           line 43, "1-2-" should be -- 1-2-1 -- ;
Column 15, line 26, "selectively" should be -- selective -- ;
Column 16, line 8,  "selectively" should be -- selective -- ;
           line 33, "selectively" should be -- selective -- ;
           line 60, after and insert - - hysterisis -- ;
Column 17, line 9,  "selectively" should be -- selective -- ;
```

Signed and sealed this 18th day of July 1972.

(SEAL)
Attest:

EDWARD M.FLETCHER,JR.          ROBERT GOTTSCHALK
Attesting Officer              Commissioner of Patents